US012801564B2

(12) United States Patent
Tu et al.

(10) Patent No.: US 12,801,564 B2
(45) Date of Patent: Nov. 17, 2026

(54) METHOD FOR MANAGING DRIVING RECORD FILES

(71) Applicant: MiTAC Digital Technology Corporation, Taoyuan City (TW)

(72) Inventors: Huah Tu, Taipei City (TW); Jeng-Yih Huang, Taoyuan City (TW)

(73) Assignee: MITAC DIGITAL TECHNOLOGY CORPORATION, Taoyuan City (TW)

( * ) Notice: Subject to any disclaimer, the term of this patent is extended or adjusted under 35 U.S.C. 154(b) by 0 days.

(21) Appl. No.: 19/182,881

(22) Filed: Apr. 18, 2025

(65) Prior Publication Data

US 2025/0328490 A1 Oct. 23, 2025

(30) Foreign Application Priority Data

Apr. 19, 2024 (TW) ................................ 113114778

(51) Int. Cl.
*G06F 16/00* (2019.01)
*G06F 16/11* (2019.01)

(52) U.S. Cl.
CPC .................................... *G06F 16/11* (2019.01)

(58) Field of Classification Search
CPC ................................ G06F 16/11; G06F 16/00
See application file for complete search history.

(56) References Cited

U.S. PATENT DOCUMENTS 7,873,619 B1 * 1/2011 Faibish .................. G06F 16/13 707/823
9,191,610 B2 11/2015 Kulkarni
9,747,229 B1 * 8/2017 Hayes .................. G06F 3/0625
2009/0106603 A1 * 4/2009 Dilman .............. G06F 11/0727 714/E11.002
2015/0193461 A1 * 7/2015 Altaparmakov .... G06F 11/1435 707/823

(Continued)

FOREIGN PATENT DOCUMENTS

TW I463873 B 12/2014

OTHER PUBLICATIONS

Search Report appended to an Office Action, which was issued to Taiwanese counterpart application No. 113114778 by the TIPO on Nov. 21, 2024, with an English translation thereof.

*Primary Examiner* — Michelle N Owyang
(74) *Attorney, Agent, or Firm* — MICHAEL BEST & FRIEDRICH LLP

(57) ABSTRACT

A method for managing driving record files is adapted for a driving recorder that includes a processor and a storage medium supporting FAT32. The method is implemented by the processor and includes: performing a formatting process on the storage medium by generating multiple files as hidden files with uniform file size in a directory, where each file is named with a file name according to a naming rule and stores multiple data pieces that are successively arranged in a sequential order, and generating multiple directory entries respectively for the files, where the directory entries have a uniform size and are in a directory table that corresponds to the directory; when a first-type error has occurred in the directory table, performing a first repairing procedure for repairing the first-type error; and when a second-type error has occurred in the directory table, performing a second repairing procedure for repairing the second-type error.

14 Claims, 2 Drawing Sheets

(56) References Cited

U.S. PATENT DOCUMENTS

| | | | | |
|---|---|---|---|---|
| 2016/0041887 | A1* | 2/2016 | Davis | G06F 11/1612 714/6.2 |
| 2018/0011872 | A1* | 1/2018 | Altaparmakov | G06F 16/122 |
| 2022/0179569 | A1* | 6/2022 | Wang | G06F 3/0679 |

* cited by examiner

METHOD FOR MANAGING DRIVING RECORD FILES

CROSS-REFERENCE TO RELATED APPLICATION

This application claims priority to Taiwanese Invention patent application Ser. No. 113114778, filed on Apr. 19, 2024, the entire disclosure of which is incorporated by reference herein.

FIELD

The disclosure relates to a method for managing files using Linux, and more particularly to a method for managing driving record files of a driving recorder.

BACKGROUND

A conventional driving recorder typically uses a secure digital (SD) card as a storage medium, with the SD card supporting a 32-bit version of File Allocation Table (FAT32). However, when old files stored on the SD card are to be deleted to make space for writing new data to the SD card, the file allocation table of FAT32 does not ensure that the new data is stored in contiguous blocks. Therefore, over long-term use, new data that is written onto the SD card may become scattered in a non-sequential manner (a phenomenon known as fragmentation), thus reducing the reading and writing efficiency of the SD card.

SUMMARY

Therefore, an object of the disclosure is to provide a method for managing driving record files that can alleviate at least one of the drawbacks of the prior art.

According to the disclosure, a method for managing driving record files is adapted for a driving recorder that includes a processor and a storage medium supporting a 32-bit version of File Allocation Table (FAT32). The method is to be implemented by the processor and includes: performing a formatting process on the storage medium by generating a plurality of files that are hidden files and that have a uniform file size, and storing the files in a directory, where each of the files is named with a file name according to a naming rule and stores a plurality of data pieces that are successively arranged in a sequential order, and generating a plurality of directory entries respectively for the files, where the directory entries are of a uniform size and are in a directory table that corresponds to the directory and that supports FAT32; determining whether a first-type error has occurred in the directory table, and in response to determining that the first-type error has occurred in the directory table, performing a first repairing procedure for repairing the first-type error; and in response to determining that the first-type error has not occurred in the directory table, determining whether a second-type error has occurred in the directory table, and performing a second repairing procedure for repairing the second-type error in response to determining that the second-type error has occurred in the directory table.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
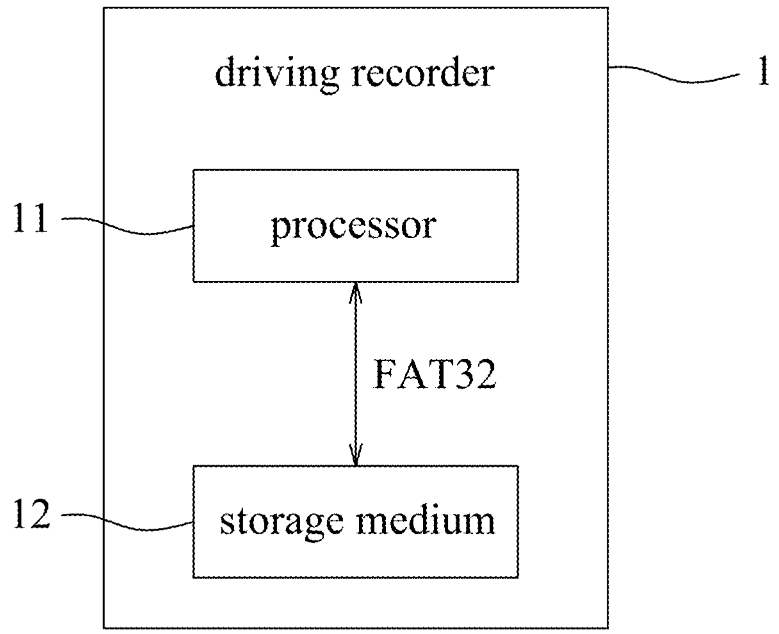
FIG. 1 is a block diagram illustrating a driving recorder according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
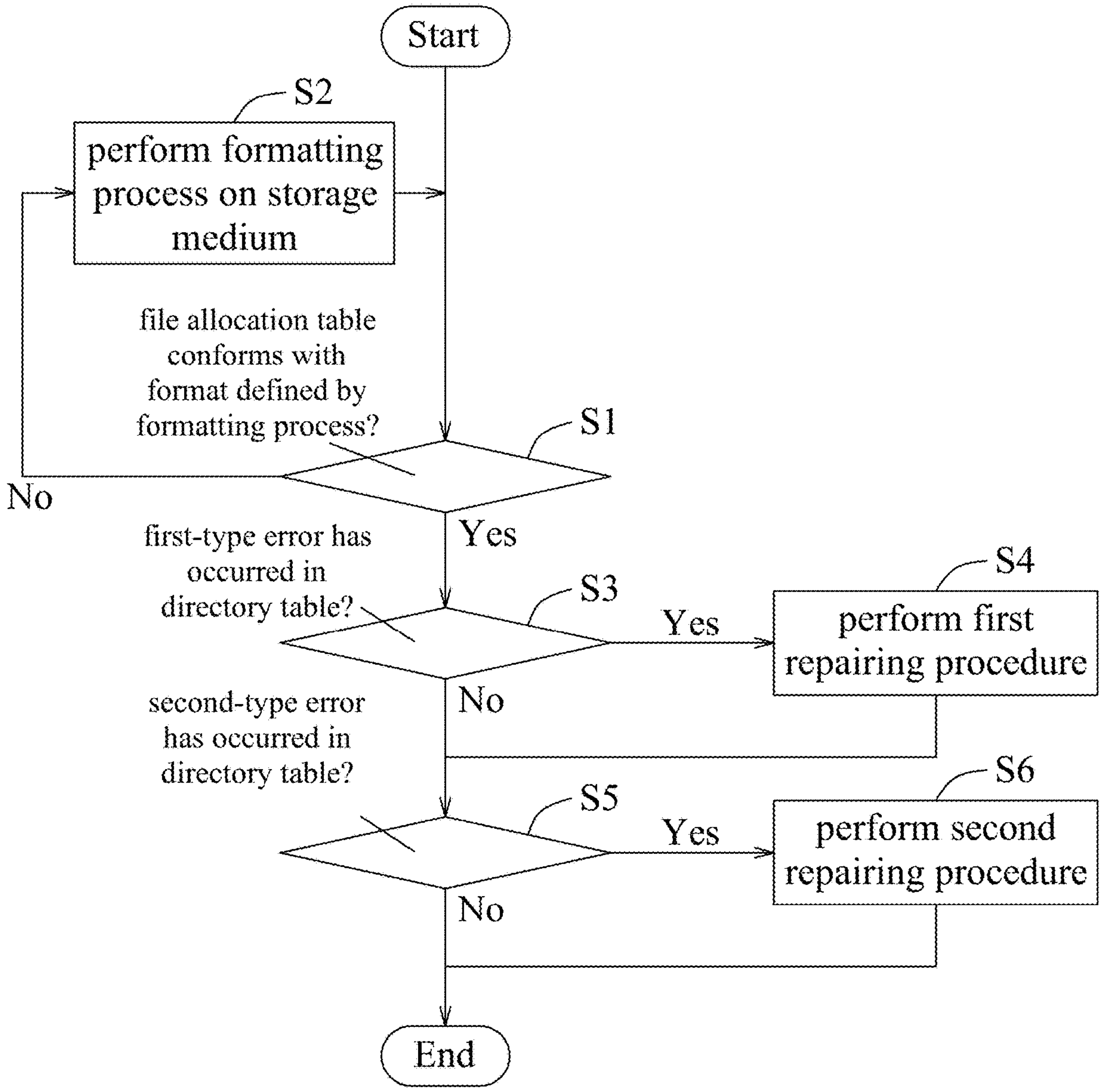
FIG. 2 is a flow chart illustrating a method for managing driving record files according to an embodiment of the disclosure.

Referring to FIGS. 1 and 2, a method for managing driving record files according to an embodiment of the disclosure is adapted for a driving recorder 1. The driving recorder 1 includes a processor 11 and a storage medium 12 that is electrically connected to the processor 11. The storage medium 12 supports FAT32 (32-bit version of the file allocation table (FAT) file system), and may be, but is not limited to, a secure digital (SD) card. The processor 11 may include, but is not limited to, one or more of a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), a system on a chip (SoC), etc. The method is implemented based on the Linux operating system, and includes a main process and a supplementary process. The main process includes steps S1 to S6 (see FIG. 2).

It should be noted that step S1 is performed after the storage medium 12 has been mounted (e.g., when the driving recorder 1 is powered on).

In step S1, after the storage medium 12 has been mounted, the processor 11 checks a file allocation table of FAT32 to determine whether the file allocation table conforms with a format that was defined by a formatting process (which will be described in detail in step S2). If the determination in step S1 is affirmative, the flow proceeds to step S3; otherwise, the flow proceeds to step S2. It should be noted that, in some cases, the driving recorder 1 may be powered on without the storage medium 12 being formatted by the formatting process previously, or the storage medium 12 may be altered so that the storage medium 12 no longer conforms with the format defined by the formatting process, and therefore the flow proceeds to step S2 to ensure that the storage medium 12 has been formatted by the formatting process in step S2 before entering later steps (e.g., steps S3 and beyond).

In step S2, in response to a user operating the driving recorder 1 to format the storage medium 12, the processor 11 performs the formatting process on the storage medium 12, and the flow goes back to step S1. During the formatting process, the processor 11 generates a plurality of files (e.g., ten files) that are hidden files and that have a uniform file size, and stores the files in a directory, where each of the files is named with a file name according to a naming rule and stores a plurality of data pieces that are successively arranged in a sequential order (i.e., the data pieces of each of the files are stored in contiguous data clusters in FAT32), and then the processor 11 generates a plurality of directory entries respectively for the files, where the directory entries are of a uniform size and are in a directory table that corresponds to the directory and that supports FAT32. The directory is associated with a video-recording module (not shown) of the driving recorder 1 (e.g., a front camera or a rear camera), and videos captured by the video-recording module are stored in the directory. In some embodiments, the vehicle includes multiple video-recording modules, and the storage medium 12 may have multiple directories associated respectively with the video-recording modules, where for each of the video-recording modules, the videos captured by the video-recording module are stored in one of the directories that is associated with the video-recording module. In this embodiment, the files generated in step S2 have a uniform file size, and when the files are being overwritten by new data, the file size remains the same.

In this embodiment, each of the directory entries is generated to include a first entry, a second entry and a third entry that are stored sequentially in the directory table and that include two extended entries (corresponding to the file name) and a basic entry, so that each file name is between 14 to 26 characters. The first entry, the second entry and the third entry each has 32 bytes, where the $12^{th}$ byte of the first entry and the $12^{th}$ byte of the second entry are both equal to 0x0f to indicate that the first entry and the second entry are the extended entries, and the $12^{th}$ byte of the third entry is equal to 0x20 to indicate that the third entry is the basic entry.

The naming rule includes, for the hidden files generated in step S2, the file names being consecutive numbers, and for a driving record file (not a hidden file), the file name indicating a time when the driving record file is recorded, and/or by which video-recording module. In one example, ten driving record files obtained by the front camera (i.e., the video-recording module) of the vehicle are stored in the directory, and the file names of the driving record files are named according to the naming rule as "YYYYMMDD_hhmmss_F", where "YYYYMMDD" represents the date (i.e., year, month and day), "hhmmss" represents the time (i.e., hour, minute and second), and "F" indicates that the driving record file was obtained by the front camera.

Each of the files has a FAT identification (ID), and the FAT IDs respectively of the files are set by the processor 11 to be a plurality of predetermined values, respectively. Specifically, for each of the files, the processor 11 sets values respectively of the $21^{st}$ byte, the $22^{nd}$ byte, the $27^{th}$ byte and the $28^{th}$ byte of the third entry in the directory entry that corresponds to the file during the formatting process, where the four bytes mentioned above collectively represent the FAT ID of the file. Moreover, for any two files with file names that are two consecutive numbers, a difference between two FAT IDs respectively of the two files is equal to a constant value. In this embodiment, a number N of files are generated in the directory in step S2, and a number N of FAT IDs respectively of the number N of files are set to be a number N of predetermined values, where N is a positive integer. In one example, N is equal to ten.

It should be noted that, for each of the files, values respectively of the $29^{th}$ byte to the $32^{nd}$ byte of the third entry in the directory entry that corresponds to the file collectively represent a file size of the file, and the constant value is set such that the constant value multiplied by 32 KB is equal to the file size. In one example, the constant value is equal to 3181. In one example, the values respectively of the 32 bytes of the first entry of a file are 42 32 00 31 00 5f 00 52 00 2e 00 Of 00 85 6d 00 ($1^{st}$ byte to $16^{th}$ byte) 70 00 34 00 00 00 ff ff ff ff 00 00 ff ff ff ff ($17^{th}$ byte to $32^{nd}$ byte); the values respectively of the 32 bytes of the second entry of the file are 01 32 00 30 00 32 00 33 00 30 00 Of 00 85 35 00 ($1^{st}$ byte to $16^{th}$ byte) 31 00 37 00 5f 00 31 00 38 00 00 00 31 00 35 00 ($17^{th}$ byte to $32^{nd}$ byte); the values respectively of the 32 bytes of the third entry of the file are 32 30 32 33 30 35 7e 32 4d 50 34 20 00 64 0b 92 ($1^{st}$ byte to $16^{th}$ byte) b1 56 b6 56 17 00 0b 92 b1 56 c3 b1 00 80 2e 05 ($17^{th}$ byte to $32^{nd}$ byte). In the above example, the FAT ID of the file is represented by the values of the $22^{nd}$ byte, the $21^{st}$ byte, the $28^{th}$ byte and the $27^{th}$ byte collectively, and is 0x0017b1c3. The file size of the file is represented by the values of the $32^{nd}$ byte, the $31^{st}$ byte, the $30^{th}$ byte and the $29^{th}$ byte collectively, and is 0x052e8000. The data pieces of the file will be stored in contiguous data clusters at locations represented by 0x0017b1c3 (i.e., the FAT ID), 0x0017b1c4, . . . , 0x0017BE2F, which are 3181 (i.e., the constant value) contiguous data clusters each having a size of 32 KB.

It should be noted that, according to conventional SD card access principle, there are two types of errors (i.e., a first-type error and a second-type error) that may occur in the SD card when the SD card is corrupted by sudden removal, power loss, etc.

In step S3, in response to determining that the file allocation table of FAT32 conforms with the format, the processor 11 determines whether the first-type type error has occurred in the directory table, where the first-type error includes a first error, a second error, a third error, a fourth error, a fifth error and a sixth error. If the processor 11 determines that any of the abovementioned six errors of the first-type error has occurred in the directory table, the flow proceeds to step S4; otherwise, the flow proceeds to step S5.

To describe in further detail, the first error is that a FAT ID of one of the files stored in the directory (a hidden file generated in step S2 or a driving record file) is equal to zero and a file size of the one of the files is equal to zero (i.e., the file size represented by the $29^{th}$ byte to the $32^{nd}$ byte of the third entry is zero). The second error is that two file names respectively of two of the files stored in the directory conform with the naming rule and two FAT IDs respectively of the two of the files are identical. The third error is that one of the directory entries does not conform with a long filename naming rule for Virtual File Allocation Table (VFAT). Specifically, the third error is determined to have occurred in response to determining that one of the extended entries of the one of the directory entries is followed by a deleted entry (i.e., the value of the $1^{st}$ byte of the third entry that corresponds to the file is 0xe5), that one of the extended entries of the one of the directory entries is followed by an end entry (i.e., the value of the $1^{st}$ byte of the third entry that corresponds to the file is 0x00), or that a quantity of the extended entries of the one of the directory entries is greater than 20.

The fourth error is that two file names respectively of two of the files stored in the directory conform with the naming rule and the two file names are identical. The fifth error is that a file name of one of the files stored in the directory conforms with the naming rule and a FAT ID of the one of the files does not match any of the predetermined values. The sixth error is that a FAT ID of one of the files stored in the directory matches one of the predetermined values and a file name of the one of the files does not conform with the naming rule.

In step S4, in response to determining that the first-type error has occurred in the directory table, the processor 11 unmounts the storage medium 12, and performs a first repairing procedure to repair the first-type error, and the flow proceeds to step S5.

To describe in further detail, the first repairing procedure includes, when the first error has occurred, marking one of the directory entries that corresponds to the file having the first error as deleted, which is done by modifying the value of the $1^{st}$ byte of the first entry, the value of the $1^{st}$ byte of the second entry, and the value of the $1^{st}$ byte of the third entry of the one of the directory entries to 0xe5. The first repairing procedure further includes, when the second error has occurred, marking one of the directory entries that corresponds to a latter one of two of the files having the second error as deleted. For example, assuming that the $7^{th}$ file and the $9^{th}$ file of the ten files both have a FAT ID being XXXXXX+3181*6, where "XXXXXX" is a six-digit number, since the $9^{th}$ file is the latter one of the two files having the second error, the directory entry of the $9^{th}$ file will be marked as deleted by the first repairing procedure. The first repairing procedure further includes, when the third error has occurred, marking one of the directory entries that corresponds to the file having the third error as deleted, which is done by modifying the value of the $1^{st}$ byte of the first entry and the value of the $1^{st}$ byte of the second entry of the one of the directory entries to 0xe5.

The first repairing procedure further includes, when the fourth error has occurred, marking one of the directory entries that corresponds to a latter one of two of the files having the fourth error as deleted, which is done by modifying the value of the $1^{st}$ byte of the first entry, the value of the $1^{st}$ byte of the second entry, and the value of the $1^{st}$ byte of the third entry of the directory entry that corresponds to the latter one of the two files having the fourth error to 0xe5. The first repairing procedure further includes, when the fifth error has occurred, marking one of the directory entries that corresponds to the file having the fifth error as deleted, which is done by modifying the value of the $1^{st}$ byte of the first entry, the value of the $1^{st}$ byte of the second entry, and the value of the $1^{st}$ byte of the third entry of the one of the directory entries to 0xe5. For example, assuming that the FAT IDs respectively of the ten files are set to be XXXXXX+3181*i, where i is equal to 0, 1, 2, . . . 9, if a file name of one of the files conforms with the naming rule, but the FAT ID of that file does not match any of XXXXXX+3181*i (i.e., the predetermined values), then the directory entry that corresponds to the file having the fifth error is marked as deleted. The first repairing procedure further includes, when the sixth error has occurred, marking one of the directory entries that corresponds to the file having the sixth error as deleted, which is done by modifying the value of the $1^{st}$ byte of the first entry, the value of the $1^{st}$ byte of the second entry, and the value of the $1^{st}$ byte of the third entry of the one of the directory entries to 0xe5. For example, if a file name of one of the files does not conform with the naming rule, and the FAT ID of that file is equal to XXXXXX+3181*4 (i.e., matches one of the predetermined values), then the directory entry that corresponds to the file having the sixth error is marked as deleted.

In step S5, the processor 11 determines whether the second-type error has occurred in the directory table. If the processor 11 determines that the second-type error has occurred, the flow proceeds to step S6; otherwise, the flow ends.

To describe in further detail, the second-type error is that, among the number N of files stored in the directory, a number M of file(s) has (have) file name(s) conforming with the naming rule, and FAT ID(s) conforming respectively with a number M of predetermined value(s) among the number N of predetermined values, where M is a positive integer that is smaller than N. That is, the second-type error is that at least one of the files stored in the directory has a file name not conforming with the naming rule, and a FAT ID not conforming with any one of the predetermined values.

In step S6, in response to determining that the second-type error has occurred in the directory table, the processor 11 performs a second repairing procedure for repairing the second-type error, and the flow ends.

To describe in further detail, the second repairing procedure includes adding a number (N-M) of new file(s) to the directory, where each of the number (N-M) of new file(s) is a hidden file and has a file name that conforms with the naming rule, and the number (N-M) of new file(s) has (have) a number (N-M) of FAT ID(s) that is (are) set respectively equal to a number (N-M) of predetermined value(s) among the number N of predetermined values excluding the number M of predetermined values. For example, assuming that N=10 and M=8, the FAT IDs respectively of the ten files are set to be XXXXXX+3181*i, where i is equal to 0, 1, 2, . . . 9. Among the ten files, only eight of the files have file names conforming with the naming rule, and none of the ten files has a FAT ID equal to XXXXXX+3181*7 or XXXXXX+3181*9, so two new files will be added to the directory, where the two new files have file names conforming with the naming rule, and the FAT IDs respectively of the two new files are set to XXXXXX+3181*7 and XXXXXX+3181*9, respectively.

After the flow of the main process has ended, the driving recorder 1 may start to capture videos, and when the processor 11 determines that the storage medium 12 has been unmounted (e.g., when the driving recorder 1 is powered off), for each of the files that has a file name conforming with the naming rule, the processor 11 implements the supplementary process to adjust a hidden attribute of the file based on the file name. In one example, for one of the files stored in the directory, when the file name of the file is one of the consecutive numbers, it means that the file is a hidden file, so the hidden attribute of the file is adjusted to indicate that the file is a hidden file, and when the file name of the file is "YYYYMMDD_hhmmss_F", it means that the file is a driving record file, so the hidden attribute of the file is adjusted to indicate that the file is not a hidden file.

It should be noted that, after the processor 11 formats the storage medium 12 with the formatting process, when the processor 11 is to store video data (e.g., a front view video) obtained from the video-recording module (e.g., the front camera) onto the storage medium 12, the processor 11 renames one of the files in the directory that is associated with the video-recording module according to the naming rule, and overwrites the data pieces of the one of the files with the video data, so that the file allocation table does not have a chance to be tampered with. That is to say, the video data will be stored in contiguous data clusters at locations pre-allocated to the one of the files, and will not be scattered in a non-sequential manner, thereby preventing fragmentation on the storage medium 12 and improving the reading and writing efficiency of the storage medium 12. It should be noted that a file is referred to as a driving record file when the data pieces of the file is overwritten by the video data.

In one example, the processor 11 overwrites the data pieces of one of the hidden files in the directory with the video data. In another example, when all hidden files in the directory have been overwritten by the processor 11 into driving record files, the processor 11 may overwrite the data pieces of an oldest one of the driving record files with the video data, but the disclosure is not limited to such.

In summary, according to the disclosure, the processor 11 formats the storage medium 12 with the formatting process such that the files in the directory have file names conforming with the naming rule and the FAT IDs correspond to the predetermined values. When the storage medium 12 is mounted, the processor 11 determines whether the first-type error and the second-type error has occurred in the directory table, and performs the first repairing procedure and/or the second repairing procedure in response to the first-type error and/or the second-type error occurring. As such, in addition to preventing fragmentation on the storage medium 12, the disclosure is also able to repair the directory table when the first-type error and/or the second-type error occurs.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for managing driving record files adapted for a driving recorder, the driving recorder including a processor and a storage medium that is an SD card supporting a 32-bit version of File Allocation Table (FAT32), the method to be implemented by the processor and comprising:

performing a formatting process on the storage medium by generating a plurality of files that are hidden files and that have a uniform file size, and storing the plurality of files in a directory, where each of the plurality of files is named with a file name according to a naming rule and stores a plurality of data pieces that are successively arranged in a sequential order, and generating a plurality of directory entries respectively for the plurality of files, where the plurality of directory entries are of a uniform size and are in a directory table that corresponds to the directory and that supports FAT32;

storing video data obtained from a video-recording module onto the storage medium by renaming one of the plurality of files in the directory that is associated with the video-recording module according to the naming rule, and overwriting the plurality of data pieces stored in the one of the plurality of files with the video data;

determining whether a first-type error has occurred in the directory table, and in response to determining that the first-type error has occurred in the directory table, performing a first repairing procedure for repairing the first-type error; and in response to determining that the first-type error has not occurred in the directory table, determining whether a second-type error has occurred in the directory table, and performing a second repairing procedure for repairing the second-type error in response to determining that the second-type error has occurred in the directory table, wherein the video data are stored in contiguous data clusters at locations pre-allocated to the one of the files, and are not scattered in a non-sequential manner, so as to prevent fragmentation on the storage medium and to improve reading and writing efficiency of the storage medium.

2. The method as claimed in claim 1, further comprising, before determining whether a first-type error has occurred in the directory table:

in response to determining that the storage medium is mounted, checking a file allocation table of FAT32.

3. The method as claimed in claim 2, wherein checking the file allocation table of FAT32 is to determine whether the file allocation table of FAT32 conforms with a format that was defined by the formatting process, wherein determining whether a first-type error has occurred in the directory table is implemented in response to determining that the file allocation table of FAT32 conforms with the format.

4. The method as claimed in claim 1, wherein the first-type error is an error where a FAT identification (ID) of one of the plurality of files stored in the directory is equal to zero and a file size of the one of the plurality of files is equal to zero, wherein the first repairing procedure includes marking one of the plurality of directory entries that corresponds to the one of the plurality of files as deleted.

5. The method as claimed in claim 1, wherein the first-type error is an error where two file names respectively of two of the plurality of files stored in the directory conform with the naming rule and two FAT IDs respectively of the two of the plurality of files are identical, wherein the first repairing procedure includes marking the directory entry that corresponds to a latter one of the two of the plurality of files as deleted.

6. The method as claimed in claim 1, wherein the first-type error is an error where one of the plurality of directory entries does not conform with a long filename naming rule for Virtual File Allocation Table (VFAT), wherein the first repairing procedure includes marking the one of the directory entries as deleted.

7. The method as claimed in claim 6, wherein performing the formatting process includes generating each of the plurality of directory entries to include a plurality of extended entries, and the error where one of the plurality of directory entries does not conform with the long filename naming rule for VFAT is determined to have occurred in response to determining that one of the plurality of extended entries of the one of the directory entries is followed by a deleted entry.

8. The method as claimed in claim 6, wherein performing the formatting process includes generating each of the plurality of directory entries to include a plurality of extended entries, and the error where one of the plurality of directory entries does not conform with the long filename naming rule for VFAT is determined to have occurred in response to determining that one of the plurality of extended entries of the one of the directory entries is followed by an end entry.

9. The method as claimed in claim 6, wherein performing the formatting process includes generating each of the plurality of directory entries to include a plurality of extended entries, and the error where one of the plurality of directory entries does not conform with the long filename naming rule for VFAT is determined to have occurred in response to determining that a quantity of the plurality of extended entries of the one of the directory entries is greater than 20.

10. The method as claimed in claim 1, wherein the first-type error is an error where two file names respectively of two of the plurality of files stored in the directory conform with the naming rule and the two file names are identical, wherein the first repairing procedure includes marking the directory entry that corresponds to a latter one of the two of the plurality of files as deleted.

11. The method as claimed in claim 1, wherein the first-type error is an error where a file name of one of the plurality of files stored in the directory conforms with the naming rule and a FAT ID of the one of the plurality of files does not match a predetermined value, wherein the first repairing procedure includes marking one of the plurality of directory entries that corresponds to the one of the plurality of files as deleted.

12. The method as claimed in claim 1, wherein the first-type error is an error where a FAT ID of one of the plurality of files stored in the directory matches a predetermined value and a file name of the one of the plurality of files does not conform with the naming rule, wherein the first repairing procedure includes marking one of the plurality of directory entries that corresponds to the one of the plurality of files as deleted.

13. The method as claimed in claim 1, wherein generating the plurality of files pre-stored in the directory is to generate a number N of files respectively having a number N of FAT IDs that are respectively set to a number N of predetermined values, where N is a positive integer, wherein the second-type error is that, among the number N of files stored in the directory, a number M of file(s) has (have) file name(s) conforming with the naming rule, and FAT ID(s) conforming respectively with a number M of predetermined value(s) among the number N of predetermined values, where M is a positive integer smaller than N, wherein the second repairing procedure includes adding a number (N-M) of new file(s) to the directory, where each of the number (N-M) of new file(s) is a hidden file and has a file name that conforms with the naming rule, and the number (N-M) of new file(s) has (have) a number (N-M) of FAT ID(s) that is (are) set respectively equal to a number (N-M) of predetermined value(s) among the number N of predetermined values excluding the number M of predetermined values.

14. The method as claimed in claim 1, further comprising:

in response to determining that the storage medium is unmounted, for each of the plurality of files that has a file name conforming with the naming rule, adjusting a hidden attribute of the file based on the file name.

* * * * *